United States Patent
Nagai et al.

(10) Patent No.: US 7,228,751 B2
(45) Date of Patent: Jun. 12, 2007

(54) BALL SCREW MECHANISM

(75) Inventors: Shigekazu Nagai, Adachi-ku (JP); Ryuuichi Masui, Iwai (JP)

(73) Assignee: SMC Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/409,177

(22) Filed: Apr. 9, 2003

(65) Prior Publication Data

US 2003/0192388 A1    Oct. 16, 2003

(30) Foreign Application Priority Data

Apr. 15, 2002    (JP) .............................. 2002-112310

(51) Int. Cl.
*F16C 25/22*    (2006.01)
(52) U.S. Cl. .................................. 74/89.44; 74/424.75
(58) Field of Classification Search ............... 74/89.44, 74/424.82, 89.4, 424.75; 384/513, 516
See application file for complete search history.

(56) References Cited

U.S. PATENT DOCUMENTS

| | | | | |
|---|---|---|---|---|
| 1,310,423 | A | * | 7/1919 | Lippert-Bruenauer ....... 384/516 |
| 1,704,031 | A | * | 3/1929 | Boehm ..................... 74/424.82 |
| 3,643,522 | A | * | 2/1972 | Fullam ....................... 74/89.44 |
| 3,673,886 | A | * | 7/1972 | Tomita et al. ............ 74/424.75 |
| 5,168,767 | A | * | 12/1992 | Morita ....................... 74/89.44 |
| 5,299,465 | A | * | 4/1994 | Kasuga ...................... 74/89.33 |
| 5,555,770 | A | | 9/1996 | Dolata et al. |
| 5,749,266 | A | * | 5/1998 | Tsukada ..................... 74/89.44 |
| 6,023,991 | A | * | 2/2000 | Yabe et al. ................. 74/89.44 |
| 6,089,113 | A | * | 7/2000 | Sato et al. ................. 74/89.44 |
| 6,327,924 | B2 | | 12/2001 | Nagai et al. |
| 6,446,520 | B1 | * | 9/2002 | Nagai et al. ............... 74/89.33 |
| 6,595,327 | B2 | * | 7/2003 | Keller ............................ 184/5 |
| 6,634,246 | B2 | * | 10/2003 | Ohya et al. ................ 74/89.44 |
| 6,732,600 | B2 | * | 5/2004 | Greubel ..................... 74/89.44 |
| 6,865,963 | B2 | * | 3/2005 | Takanohashi et al. ...... 74/89.44 |
| 2001/0018850 | A1 | * | 9/2001 | Walton ...................... 74/89.44 |
| 2002/0117015 | A1 | * | 8/2002 | Greubel ..................... 74/89.44 |

FOREIGN PATENT DOCUMENTS

| | | |
|---|---|---|
| CN | 1219795 | 6/1999 |
| DE | 1 908 103 | * 9/1970 |
| DE | 33 23 347 A1 | 1/1985 |
| DE | 28 29 433 C2 | 9/1986 |
| DE | 41 20 495 A1 | 12/1992 |
| DE | 44 35 759 A1 | 4/1995 |
| DE | 41 31 486 C2 | 10/1999 |
| DE | 199 30 434 A1 | 1/2000 |
| DE | 200 16 210 U1 | 1/2001 |
| JP | 6-147290 | 5/1994 |
| JP | 6-300108 | 10/1994 |
| JP | 7-110030 | 4/1995 |
| JP | 11-351350 | 12/1999 |
| JP | 2000-213617 | 8/2000 |
| JP | 2001-116102 | 4/2001 |
| KR | 1999-44022 | 6/1999 |

\* cited by examiner

*Primary Examiner*—William C. Joyce
(74) *Attorney, Agent, or Firm*—Paul A. Guss (57) ABSTRACT

A ball screw mechanism includes a ball screw shaft of a metal material coaxially connected to a rotary driving source, a nut member of a resin material being screwed onto the ball screw shaft, a plate member fixed to an upper surface of the nut member by screw members, and steel balls which are arranged on a passage formed in the nut member closed by the plate member and which are installed into screw grooves of the ball screw shaft and the nut member.

6 Claims, 5 Drawing Sheets

BALL SCREW MECHANISM

BACKGROUND OF THE INVENTION

1. Field of the Invention

The present invention relates to a ball screw mechanism for displacing a nut member screwed onto a ball screw shaft in the axial direction driven by a rotary driving source.

2. Description of the Related Art

Conventionally, a screw section is engraved on an outer circumferential surface of a slide screw shaft which is rotatable under the rotary action of a rotary driving source such as a motor. A nut member of a metal material is screwed onto the screw section of the slide screw. A female screw section is formed in the nut member, for being screwed onto the screw section of the slide screw shaft. The displacement of the nut member in the rotational direction is restricted, and the rotational motion of the slide screw shaft is converted into the rectilinear motion of the nut member. Thus, the nut member can be displaced in the axial direction.

However, in the conventional slide screw as described above, when the nut member is displaced in the axial direction of the slide screw shaft, the displacement is effected while the screw section of the slide screw shaft is engaged with the female screw section of the nut member. Therefore, the frictional resistance appears between the screw section and the female screw section, so that transmission efficiency is low when the rotary motion of the slide screw shaft is converted into the rectilinear motion of the nut member.

Further, the slide screw shaft and the nut member are abraded due to the frictional resistance. Therefore, durability is lowered as a result of the use for many years.

On the other hand, in order to improve the durability and the transmission efficiency to transmit the driving force from a slide screw shaft to a nut member, a ball screw has been adopted, in which steel balls are interposed between a screw section and a female screw section, in place of the slide screw described above. In this case, it is necessary to grind the groove of the female screw section of the nut member on which the steel balls are arranged, in order to improve surface accuracy.

Further, in order to reduce the abrasion of the screw section of a ball screw shaft, it is necessary to heat the ball screw shaft for hardening the surface of the ball screw shaft. During the heat treatment, some strain may appear in relation to the shaft center of the ball screw shaft or the like due to the heat. Therefore, it is further necessary to correct the strain or the like of the ball screw shaft.

That is, when the ball screw is adopted, it is newly required, for example, to grind, heat, and correct the strain, as compared with the slide screw. Therefore, production steps are complicated, and the cost is raised accordingly.

Further, rolling resistance arises in the steel balls when the nut member is displaced in the axial direction with respect to the screw section of the ball screw shaft. For this reason, a lubricant is used for reducing the rolling resistance. However, it is necessary to periodically supply the lubricant, and the periodical maintenance operation is complicated.

SUMMARY OF THE INVENTION

A general object of the present invention is to provide a ball screw mechanism which makes it possible to reduce cost and improve durability by displaceably screwed a nut member of a resin material onto a ball screw shaft.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
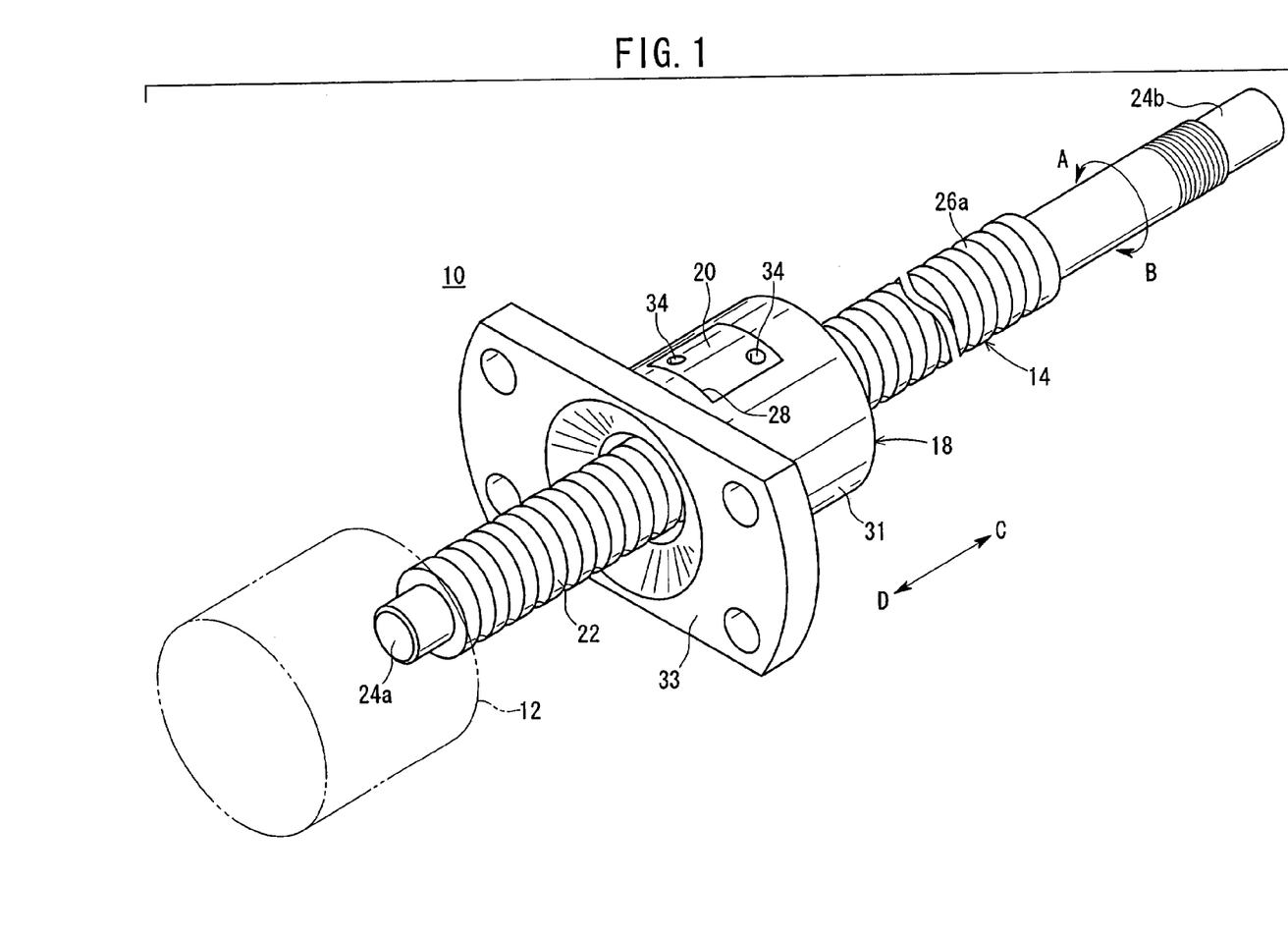
FIG. 1 is a perspective view illustrating a ball screw mechanism according to an embodiment of the present invention.
Figure 2:
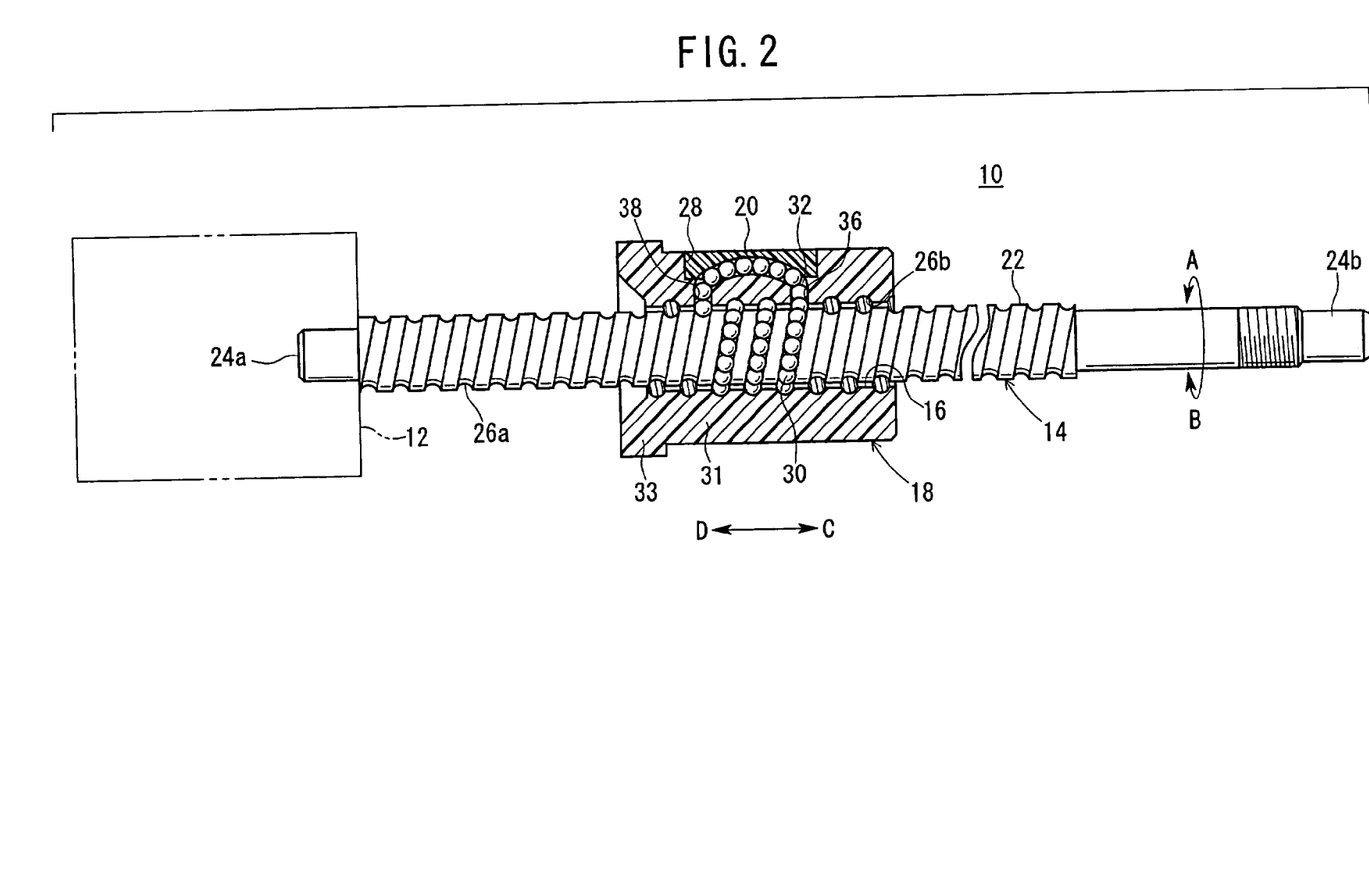
FIG. 2 is a longitudinal sectional view illustrating the ball screw mechanism shown in FIG. 1.

With reference to FIGS. 1 and 2, reference numeral 10 indicates a ball screw mechanism according to an embodiment of the present invention.

The ball screw mechanism 10 comprises a ball screw shaft 14 which is coaxially connected to an unillustrated drive shaft of a rotary driving source 12, a nut member 18 through which a female screw section 16 (see FIG. 2) is formed penetratingly for being screwed with the ball screw shaft 14, and a plate member 20 which closes an installation hole 28 of the nut member 18 as described later on.

As shown in FIG. 2, the ball screw shaft 14, which is formed of a metal material, includes a male screw section 22 engraved on the outer circumferential surface. The ball screw shaft 14 includes connecting sections 24a, 24b which are disposed at both ends and which are diametrally reduced by predetermined lengths for connecting to the rotary driving source 12 or the like. A screw groove (first screw groove) 26a is formed on the male screw section 22. The screw groove 26a has a substantially semicircular cross section so that a plurality of steel balls 30 are arranged thereon.

The nut member 18 has a cylindrical section 31 which is formed by injection-molding a resin material, and a flange section 33 which is formed at one end of the cylindrical section 31. The installation hole 28 is formed in the outer circumferential surface of the cylindrical section 31. In the installation hole 28, a passage 32 is formed for the steel balls 30 to move during the displacement of the nut member 18. The substantially rectangular plate member 20 is fixed to the installation hole 28 by a pair of screw members 34, and thus the installation hole 28 is closed (see FIG. 1). The plate member 20 installed to the installation hole 28 is formed so that the outer circumferential surface of the plate member 20 is substantially flush with the circumferential surface of the nut member 18.

The plurality of steel balls 30 of a metal material are rollably and/or slidably between the screw groove 26a of the male screw section 22 of the ball screw shaft 14 and a screw groove (second screw groove) 26b of the female screw section 16 of the nut member 18. The screw groove 26b has a substantially semicircular cross section so that the plurality of steel balls 30 are arranged thereon. The plurality of steel balls 30 are arranged continuously to the respective screw grooves 26a, 26b of the ball screw shaft 14 and the nut member 18. The plurality of steel balls 30 roll and/or slide along the circumferential surfaces of the screw grooves 26a, 26b when the nut member 18 is displaced. The nut member 18 screwed onto the ball screw shaft 14 is restricted against the displacement in the rotational direction about the center of the ball screw shaft 14 by an unillustrated fixing means.

The passage 32 has a substantially C-shaped cross section closed by the plate member 20. A first opening 36 of the passage 32 on one end is open toward the screw groove 26a of the ball screw shaft 14. Similarly, a second opening 38 disposed on the other end is open toward the screw groove 26a of the ball screw shaft 14. The first and second openings 36, 38 communicate with the passage 32. The first and second openings 36, 38 are arranged so that when the first opening 36 is positioned just above the screw groove 26a, the second opening 38 is also positioned just above another portion of the screw groove 26a.

That is, when the nut member 18 is displaced in the axial direction of the ball screw shaft 14, the steel balls 30 arranged on the screw groove 26a disposed forward in the displacement direction are fed from the first opening 36 into the passage 32. The steel balls 30 previously arranged in the passage 32 are pressed by the steel balls 30 fed from the first opening 36 into the passage 32, and the steel balls 30 are supplied from the second opening 38 to the screw groove 26a disposed backward in the displacement direction.

In this arrangement, the passage 32 is closed by the plate member 20. Therefore, the steel balls 30 fed into the passage 32 do not go out of the passage 32. When the plate member 20 is detached, it is possible to easily perform the maintenance for the interior of the passage 32 and the exchange operation for the steel balls 30, for example.

The nut member, which was conventionally formed of a metal material, is formed of the resin material having low surface hardness. Accordingly, when the nut member 18 is displaced along the ball screw shaft 14, the load (for example, the inertia) exerted on the ball screw shaft 14 is mitigated during the rolling movement. As a result, it is possible to form the ball screw shaft 14 with a metal material having low hardness such as light metal or mild steel (e.g., aluminum). Therefore, it is possible to reduce the weight of the ball screw shaft 14 and the driving load exerted on the rotary driving source 12. Thus, it is possible to realize a compact size of the rotary driving source.

When the nut member 18 is formed of the resin material having the relatively low surface hardness, it is possible to lower the surface hardness of the surface of the male screw section 22 of the ball screw shaft 14, as compared with the conventional nut member of the metal material. As a result, it is unnecessary to heat the ball screw shaft 14 in order to increase the surface hardness. Further, it is also unnecessary to correct the strain of, for example, the shaft center of the ball screw shaft 14 caused by the heat treatment.

The plate member 20 is formed, for example, by injection molding by using a resin material such as PBT (polybutylene terephthalate). The plate member 20 is installed to the installation hole 28 of the nut member 18 by the screw members 34.

Figure 3:
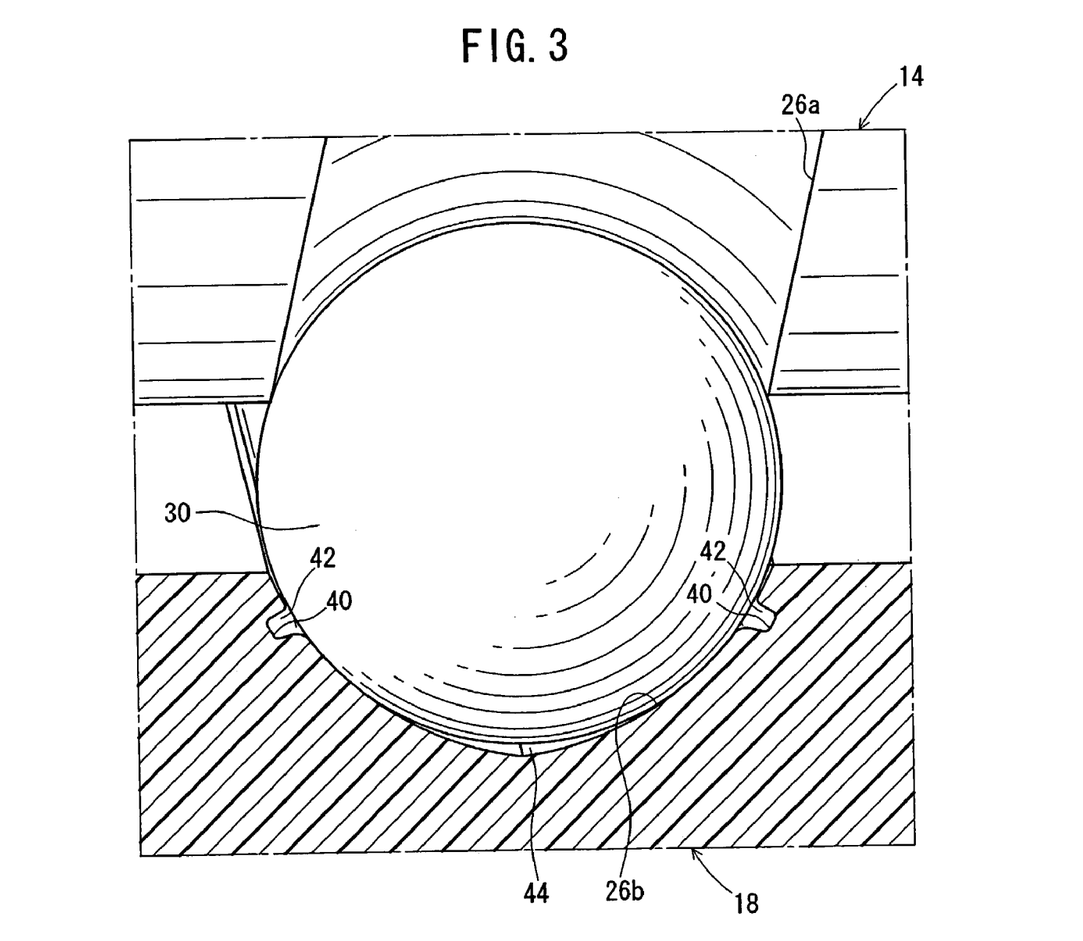
FIG. 3 is a magnified longitudinal sectional view illustrating a female screw section of a nut member shown in FIG. 2.

As shown in FIG. 3, annular oil sumps 40 are formed on the screw groove 26b of the nut member 18. The annular oil sumps 40 extend along the circumferential surface of the screw groove 26b and is separated by a predetermined length from the bottom of the screw groove 26b on which the steel ball 30 is arranged. The oil sumps 40 are recessed by a predetermined depth from the circumferential surface of the screw groove 26b. The oil sumps 40 are filled with a lubricant 42 (for example, grease). When the lubricant 42 is coated on the surfaces of the steel balls 30 in displacement of the nut member 18, oil films can be formed on the surfaces of the steel balls 30. As a result, the steel balls 30 are capable of smoothly rolling and/or sliding on the circumferential surface of the screw groove 26b. The oil sumps 40 can be formed with ease by the injection molding.

The lubricant 42 comprises an olefin-based grease. The olefin-based grease is suitable for the resin material. Therefore, it is possible to appropriately lubricate the nut member 18 which is formed of the resin material. Accordingly, it is possible to form the oil films on the surfaces of the steel balls 30 more appropriately. Therefore, it is possible to reduce abrasion, and it is possible to improve durability.

When the kinematic viscosity of the olefin-based grease adopted for the lubricant 42 is not less than 2000 cst, the following operation is effected. When the load exerted on the steel balls 30 in the ball screw mechanism 10 is small, the steel balls 30 slide along the screw grooves 26a, 26b. When the load exerted on the steel balls 30 is large, the steel balls 30 roll along the screw grooves 26a, 26b.

The conventional grease or the like used for the ball screw shaft has its kinematic viscosity of about 100 cst. Therefore, the oil films formed on the surfaces of the steel balls are thin. When the steel balls slide on the screw grooves, the surfaces run out of the oil films, and the abrasion is progressively caused.

In the present invention, the kinematic viscosity of the grease adopted for the lubricant 42 is not less than 2000 cst, and the oil films formed on the surfaces of the steel balls 30 are thick. Accordingly, lubrication by the lubricant 42 is effective in both cases when the steel balls 30 slide along the screw grooves 26a, 26b, and when the steel balls 30 roll along the screw grooves 26a, 26b. Therefore, it is possible to appropriately improve the durability of the ball screw mechanism 10.

Further, a clearance 44 is formed at the bottom of the screw groove 26b. The clearance 44 is slightly recessed from the outer circumferential surface of the steel ball 30 when the steel ball 30 is arranged on the screw groove 26b. Accordingly, the clearance 44 is also filled with the lubricant 42 in the same manner as in the oil sumps 40. It is possible to appropriately form the oil films on the surfaces of the steel balls 30 with the lubricant 42.

The ball screw mechanism 10 according to the embodiment of the present invention is basically constructed as described above. Next, its operation, function, and effect will be explained.

When an electric signal is supplied from an unillustrated power source to the rotary driving source 12, the ball screw shaft 14 connected to the unillustrated drive shaft is rotated. As shown in FIG. 1, when the ball screw shaft 14 is rotated in the direction of the arrow A, the nut member 18 screwed onto the ball screw shaft 14 is displaced in the axial direction (direction of the arrow C), because the nut member 18 is restricted against the displacement in the rotational direction.

During this process, as shown in FIG. 2, the steel balls 30 arranged on the screw groove 26a are fed one after another in the direction (direction of the arrow D) opposite to the traveling direction (direction of the arrow C) of the nut member 18 via the passage 32 from the first opening 36 of the nut member 18. The steel balls 30 previously disposed in the passage 32 are pressed by the steel balls 30 fed from the screw groove 26a. When the first opening 36 is positioned just above the screw groove 26a, the second opening 38 is also positioned just above another pitch of the screw groove 26a. Therefore, in this arrangement, the steel balls 30 arranged on the screw groove 26a disposed forward in the displacement direction of the nut member 18 are fed into the passage 32 from the first opening 36. The steel balls 30 previously disposed in the passage 32 are pressed by the steel balls 30 fed into the passage 32 from the first opening 36, and the steel balls 30 are successively supplied from the second opening 38 to the screw groove 26a disposed backward in the displacement direction.

That is, steps are repeated such that when the nut member 18 is displaced in the axial direction, the steel balls 30 are fed from the first opening 36 into the passage 32, and the steel balls 30 are successively supplied from the second opening 38 to the screw groove 26a disposed backward in the traveling direction. Accordingly, in this structure, the steel balls 30 are circulated while rolling and/or sliding.

The steel balls 30 in the screw groove 26a are appropriately lubricated by the lubricant 42 in the oil sumps 40 formed on the screw groove 26a of the nut member 18. As a result, the nut member 18 can be displaced more smoothly in the axial direction. Further, it is unnecessary to perform any complicated operation for periodically applying the lubricant 42 to the steel balls 30.

When the characteristic of the current supplied from the unillustrated power source to the rotary driving source 12 is reversed from the above, the ball screw shaft 14 is rotated in the direction of the arrow B (see FIG. 1). When the ball screw shaft 14 is rotated in the direction of the arrow B, the nut member 18 screwed onto the ball screw shaft 14 is displaced in the axial direction (direction of the arrow D) opposite to the above.

That is, the steel balls 30 arranged between the screw groove 26a of the ball screw shaft 14 and the screw groove 26b of the nut member 18 roll and/or slide on the circumferential surfaces of the screw groove 26a and the screw groove 26b. Accordingly, the nut member 18 is displaced in the axial direction (direction of the arrow C or D) of the ball screw shaft 14.

As described above, in the embodiment of the present invention, the ball screw shaft 14 of the metal material is engraved with the screw groove 26 on the outer circumference, and the nut member 18 is screwed by the steel balls 30 disposed between the nut member 18 and the screw groove 26a of the ball screw shaft 14. When the nut member 18 of the resin material is displaced in the axial direction by the steel balls 30 where the displacement of the nut member 18 in the rotational direction is restricted, it is possible to reduce the resistance between the ball screw shaft 14 and the nut member 18 during the rolling and/or the sliding of the steel balls 30. Therefore, it is possible to more smoothly displace the nut member 18 in the axial direction. It is also possible to improve the transmission efficiency when the rotary motion of the ball screw shaft 14 is converted into the rectilinear motion of the nut member 18, as compared with the conventional structure of the slide screw.

When the nut member 18 is formed of the resin material, it is possible to reduce the load exerted on the ball screw shaft 14 which is screwed with the nut member 18 during the rolling and/or the sliding of the steel balls 30. Therefore, it is unnecessary to heat the ball screw shaft which has been hitherto applied in order to increase the surface hardness of the ball screw shaft. As a result, it is also unnecessary to correct the strain of, for example, the axial center having been hitherto caused in the ball screw shaft due to the heat generated in the heat treatment. Therefore, it is possible to further improve the productivity.

When the nut member 18 is formed of the resin material, it is not necessary to grind the female screw section 16 in order to improve the accuracy of the female screw section 16. The grinding is a complicated step. Accordingly, it is possible to further improve the productivity, and it is possible to reduce the weight of the nut member 18.

The ball screw shaft 14 can be formed of the metal material having low hardness such as light metal or mild steel (e.g., aluminum). Therefore, it is possible to reduce the weight of the ball screw shaft 14, and it is possible to reduce the driving load exerted on the rotary driving source 12.

When the oil sumps 40 and the clearance 44 filled with the lubricant 42 are formed on the screw groove 26b of the nut member 18, the oil films are appropriately formed on the outer circumferential surfaces of the steel balls 30 by the lubricant 42 in the oil sumps 40. Therefore, it is unnecessary to perform the maintenance operation for periodically supplying the lubricant 42 to the steel balls 30.

Figure 4:
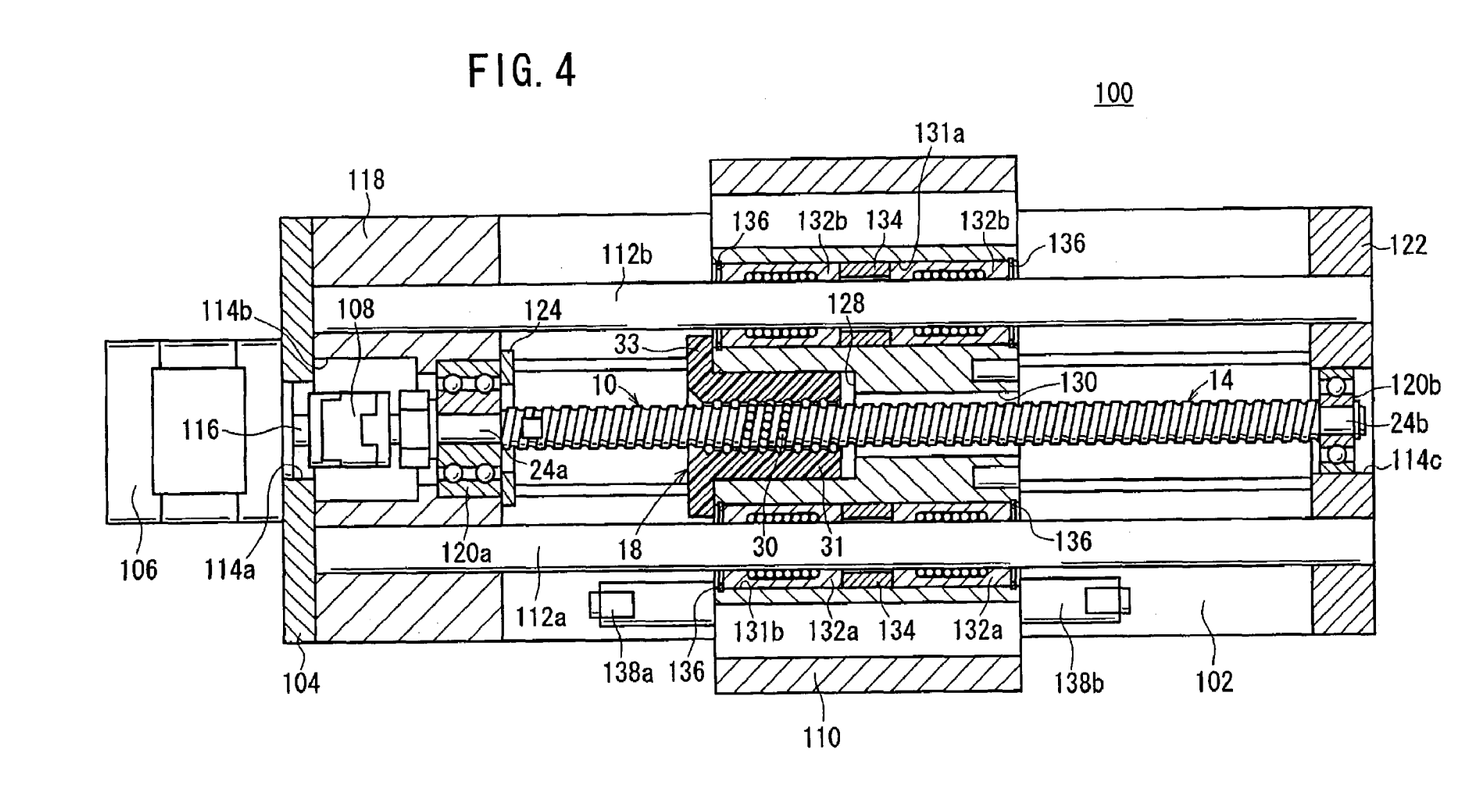
FIG. 4 is a lateral sectional view illustrating an actuator to which the ball screw mechanism shown in FIG. 1 is applied.
Figure 5:
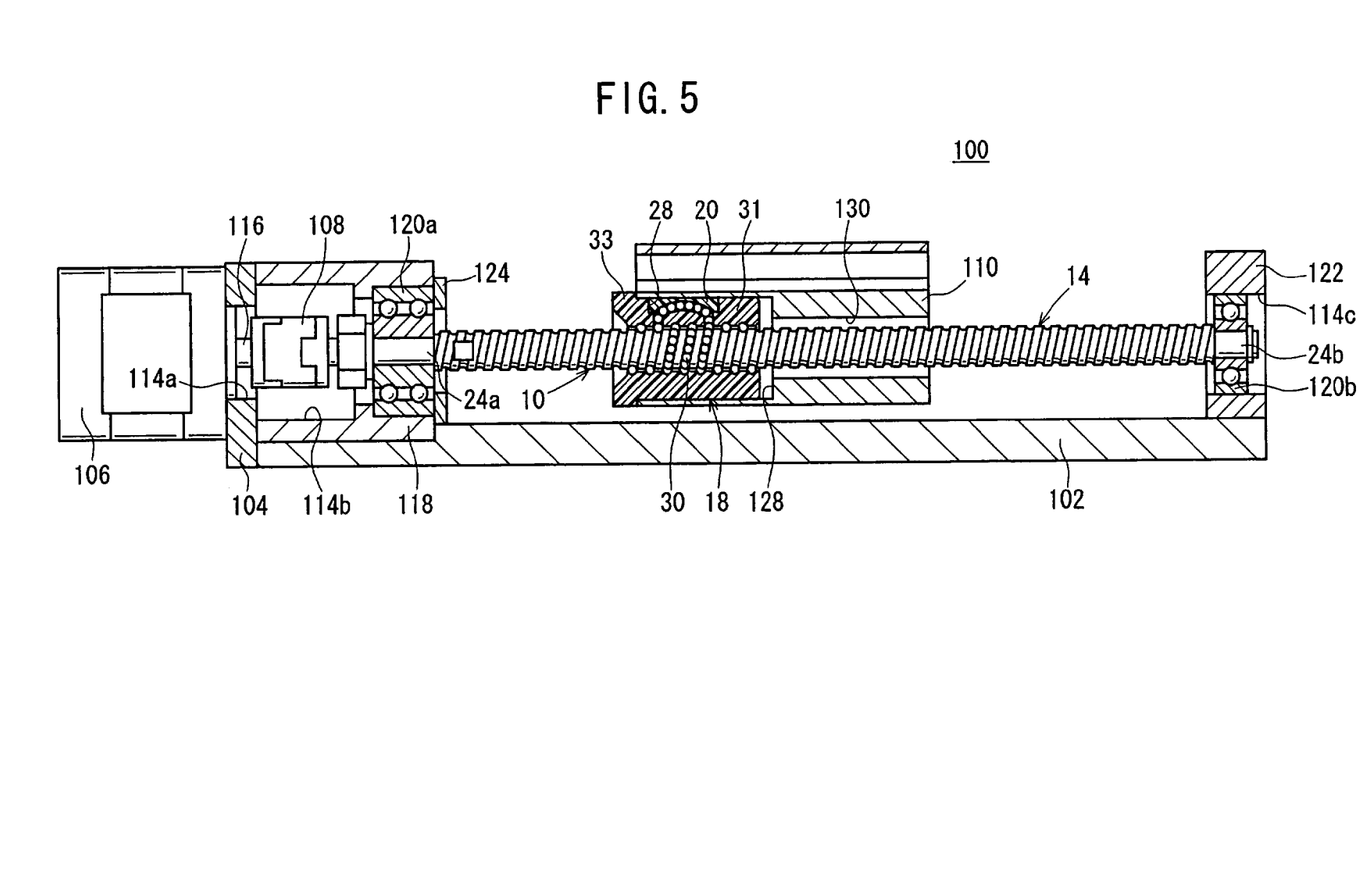
FIG. 5 is a longitudinal sectional view illustrating the actuator shown in FIG. 4.

Next, with reference to FIGS. 4 and 5, an actuator 100 is explained, to which the ball screw mechanism 10 according to the embodiment of the present invention is applied.

The actuator 100 comprises an elongate frame (body) 102, a rotary driving source 106 connected to one end of the frame 102 with a first end plate 104, the ball screw mechanism 10 served as a detachable unit with respect to the frame 102 for transmitting the rotary driving force of the rotary driving source 106 with a coupling member 108, a slider 110 reciprocating in the axial direction of the frame 102 by the driving force transmitted by the ball screw mechanism 10, and guide shafts 112a, 112b for guiding the slider 110 along the frame 102.

The first end plate 104 is connected to one end of the frame 102 by unillustrated screw members. The rotary driving source 106 driven by an electric signal is connected to a substantially central portion of the first end plate 104. A hole 114a is formed through the substantially central portion of the first end plate 104. A drive shaft 116 of the rotary driving source 106 is inserted into the hole 114a. A housing (body) 118 arranged on the frame 102 is connected to a side of the first end plate 104 opposite to the side on which the rotary driving source 106 is connected. A hole 114b formed in the housing 118 communicates with the hole 114a of the first end plate 104. A bearing member 120a is installed to the hole 114b of the housing 118.

A second end plate (body) 122 is connected to the other end of the frame 102 by unillustrated screw members in the same manner as described above. A bearing member 120b is installed to a hole 114c formed in a substantially central portion of the second end plate 122.

One connecting section 24a of the ball screw shaft 14 of the ball screw mechanism 10 is rotatably supported by the bearing member 120a in the housing 118. The connecting section 24a is coaxially connected to the drive shaft 116 of the rotary driving source 106 by the coupling member 108. That is, the ball screw shaft 14 is rotatable together with the drive shaft 116 by the rotary driving source 106.

A disk-shaped bearing-holding member 124 is installed between the ball screw shaft 14 and the end surface of the bearing member 120a. The outer diameter of the bearing-holding member 124 is larger than the hole 114b. Therefore, the bearing member 120a is prevented from disengagement from the housing 118. The other connecting section 24b of the ball screw shaft 14 is rotatably supported by the bearing member 120b of the second end plate 122.

The nut member 18 is inserted into the slider 110 so that the flange section 33 is disposed on the side near the rotary driving source 106. The nut member 18 is displaceable together with the slider 110.

The guide shafts 112a, 112b are separated by predetermined distances from the ball screw shaft 14, and are provided substantially in parallel on the both sides of the ball screw shaft 14. First ends of the guide shafts 112a, 112b are inserted into and supported by the housing 118. Second ends of the guide shafts 112a, 112b are inserted into and supported by the second end plate 122.

An installation hole 128 is formed at a central portion of the slider 110 on the side near the housing 118 and the nut member 18 is inserted into the installation hole 128. A through-hole 130 having a reduced diameter as compared with the installation hole 128 extends toward the second end plate 122. The ball screw shaft 14 is inserted into the through-hole 130.

A pair of guide holes 131a, 131b (see FIG. 4) are formed on both sides of the through-hole 130 of the slider 110. The guide holes 131a, 131b are disposed substantially in parallel and separated from each other by a predetermined spacing distance. A plurality of ball bushes 132a, 132b are installed into the guide holes 131a, 131b for holding the guide shafts 112a, 112b. The ball bushes 132a, 132b guide the outer circumferential surfaces of the guide shafts 112a, 112b highly accurately. Spacers 134 are interposed between the ball bushes 132a, 132b, and hold the ball bushes 132a, 132b while separating the ball bushes 132a, 132b from each other by predetermined distances.

Annular disengagement-preventive rings 136 are installed in the vicinity of the openings of the guide holes 131a, 131b. The ball bushes 132a, 132b are prevented from disengagement from the slider 110 by the disengagement-preventive rings 136. That is, both sides of the slider 110 are guided by the guide shafts 112a, 112b around the center of the ball screw mechanism 10. Accordingly, the slider 110 can linearly move highly accurately because the guide shafts 112a, 112b guide the slider 110.

Dampers 138a, 138b are installed to the end surfaces of the slider 110, and face the housing 118 and the second end plate 122, respectively. The dampers 138a, 138b can absorb the shock generated in the slider 110 at the displacement end positions when the slider 110 is displaced in the axial direction (see FIG. 4).

The actuator 100 is basically constructed as described above, to which the ball screw mechanism 10 according to the embodiment of the present invention is applied. Next, its operation, function, and effect will be explained.

When an unillustrated power source is energized, the rotary driving force of the rotary driving source 106 is transmitted via the coupling member 108 to the ball screw shaft 14. The ball screw shaft 14 is rotated in the predetermined direction is screwed by the female screw section 16 of the nut member 18. Therefore, the slider 110 connected to the nut member 18 is displaced together with the nut member 18 in the axial direction of the frame 102 under the guiding action of the guide shafts 112a, 112b. When the characteristic of the current flowing through the rotary driving source 106 is switched by an unillustrated controller, the slider 110 can reciprocate along the axis of the frame 102.

Consequently, the ball screw shaft 14 is adopted for the rotary shaft onto which the nut member 18 is screwed, and the nut member 18 is displaced in the axial direction by the steel balls 30. Accordingly, it is possible to improve the transmission efficiency when the rotary motion of the ball screw shaft 14 is converted into the rectilinear motion of the nut member 18 as compared with the conventional screw structure. Therefore, the driving force transmitted from the rotary driving source 106 can be efficiently converted into the reciprocating motion of the slider 110.

The ball screw shaft 14 can be formed of the metal material such as aluminum having the relatively small material hardness. Accordingly, it is possible to reduce the weight of the ball screw shaft 14, and it is possible to reduce the driving load exerted on the rotary driving source 106. Therefore, the rotary driving source 106 can be compact. Further, it is possible to realize the compact size and the light weight of the actuator 100.

When the oil sumps 40 and the clearance 44 to be filled with the lubricant 42 are formed on the screw groove 26b of the nut member 18, the oil films are formed on the outer circumferential surfaces of the steel balls 30 by the lubricant 42. Therefore, it is unnecessary to perform the maintenance operation for periodically supplying the lubricant 42 to the steel balls 30.

When the lubricant 42 in the clearance 44 and the oil sumps 40 of the screw groove 26b is the olefin-based grease, and the kinematic viscosity of the olefin-based grease is not less than 2000 cst, lubrication by the lubricant 42 is effective in both cases when the steel balls 30 slide along the screw grooves 26a, 26b, and when the steel balls 30 roll along the screw grooves 26a, 26b, at the time when the nut member 18 is displaced along the axis of the ball screw shaft 14. Therefore, it is possible to appropriately improve the durability of the ball screw mechanism 10.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A ball screw mechanism comprising:
   a ball screw shaft of a metal material having a first ball screw groove engraved on an outer circumference thereof, said first ball screw groove having solely a semicircular cross section conforming in shape to surfaces of balls disposed in said first ball screw groove, without other grooves, profiles or clearances being formed in said first ball screw groove; and
   a nut member of a resin material being screwed onto said ball screw shaft via balls between said first ball screw groove and a second ball screw groove formed in said nut member,
   wherein rotation of said nut member is restricted, and said nut member is displaceable in an axial direction of said ball screw shaft,
   wherein a pair of oil sumps is formed on only said second ball screw groove of said nut member, said oil sumps extending along a circumferential surface of said second ball screw groove on respective sides of said balls, and being separated by a predetermined length from a bottom of said second ball screw groove,
   wherein said oil sumps comprise a pair of respective oil-retaining recesses formed and recessed into said nut member, each of said oil-retaining recesses being recessed a predetermined depth from said circumferential surface of said second ball screw groove, wherein openings of said oil-retaining recesses facing said balls are covered by said surfaces of said balls, and wherein a clearance is formed at said bottom of said second ball screw groove, between said second ball screw groove and said ball in said second ball screw groove.

2. The ball screw mechanism according to claim 1, wherein said ball screw shaft is formed of light metal or mild steel.

3. The ball screw mechanism according to claim 1, wherein said nut member has an installation hole opening on a circumferential surface of said nut member, and said installation hole is closed by a plate member.

4. The ball screw mechanism according to claim 1, wherein said nut member is formed by injection molding.

5. The ball screw mechanism according to claim 1, wherein said pair of oil sumps is filled with a lubricant, and said lubricant comprises an olefin-based grease having a kinematic viscosity of not less than 2000 cst.

6. The ball screw mechanism according to claim 1, wherein said ball screw shaft is rotatably supported by a body of an actuator, said nut member is displaceable in said axial direction by rotation of a rotary driving source, and said nut member is connected to a slider.

* * * * *